United States Patent
Mita et al.

(10) Patent No.: US 6,881,897 B2
(45) Date of Patent: Apr. 19, 2005

(54) SHIELDING STRUCTURE OF SHIELDING ELECTRIC WIRE

(75) Inventors: Akira Mita, Haibara-gun (JP); Tetsuro Ide, Haibara-gun (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/886,684

(22) Filed: Jul. 9, 2004

(65) Prior Publication Data

US 2005/0006128 A1 Jan. 13, 2005

(30) Foreign Application Priority Data

Jul. 10, 2003 (JP) ..................................... P2003-272838
Jul. 11, 2003 (JP) ..................................... P2003-273333

(51) Int. Cl.[7] ................................................ H05K 9/00
(52) U.S. Cl. ...................... 174/35 C; 174/51; 174/59; 174/60
(58) Field of Search ............................. 174/51, 59, 60, 174/35 C

(56) References Cited

U.S. PATENT DOCUMENTS 6,605,775 B1 * 8/2003 Seeber et al. ............. 174/35 C
6,639,146 B1 * 10/2003 Chiu ......................... 174/35 R
6,664,465 B1 * 12/2003 Seeber ...................... 174/35 R
6,700,065 B1 * 3/2004 Karlsson ................... 174/74 R

FOREIGN PATENT DOCUMENTS

JP          2001-6767 A          1/2001

* cited by examiner

Primary Examiner—Hung V. Ngo
(74) Attorney, Agent, or Firm—Sughrue Mion, PLLC

(57) ABSTRACT

In a shielding structure of a shielding electric wire in which the shielding electric wire and a ground wire are interposed between two resin members, and a compressive force is caused to act on the resin members and an ultrasonic wave is simultaneously applied to fuse the resin portions, thereby forming a shielded portion, a protruded portion 20 is provided on one of junction faces of the two resin members and a hole 21 including a protrusion inserting portion 21a for inserting the protruded portion 20 and a resin inflow portion 21b provided in an inner position from the protrusion inserting portion 21a and having a smaller width than a width of the protrusion inserting portion 21a is provided on the other junction face, and step faces at both sides on a boundary between the protrusion inserting portion 21a and the resin inflow portion 21b in the hole 21 are formed to be a pair of inclined faces 21c and 21c.

12 Claims, 17 Drawing Sheets

US 6,881,897 B2

SHIELDING STRUCTURE OF SHIELDING ELECTRIC WIRE

BACKGROUND OF THE INVENTION

1. Technical Field

The present invention relates to a shielding structure of a shielding electric wire which is formed by ultrasonic welding a shielding electric wire and a ground wire with the use of two resin members.

2. Related Art

A conventional shielding structure using ultrasonic welding has been disclosed in Unexamined Japanese Patent Publication 2001-6767. The shielding structure is formed by using two resin members 50 and 51 having arcuate channels 50b and 51b formed on mutual junction faces 50a and 51a and an ultrasonic horn as shown in FIGS. 13(a) and 13(b). More specifically, as shown in FIGS. 14 to 17, a ground wire 53 is mounted in the upper position of a shielding electric wire 52 having the outer periphery of a core 52a covered with a braided wire (a shielding member) 52c and the shielding electric wire 52 portion mounting the ground wire 53 is interposed between the two resin members 50 and 51 to apply an ultrasonic vibration by means of the ultrasonic horn while compressing the two upper and lower resin members 50 and 51.

When the ultrasonic vibration is applied by the ultrasonic horn, the resin members 50 and 51, an insulating outer cover 52d of the shielding electric wire 52 and an insulating outer cover 53b of the ground wire 53 are fused by a vibration energy in the application of an ultrasonic wave so that a core 53a of the ground wire 53 and the braided wire 52c of the shielding electric wire 52 are brought into a contact state. When the application of the ultrasonic wave is completed and the fused portions are solidified, the two resin members 50 and 51 are integrated so that the shielding electric wire 52 and the ground wire 53 are fitted to each other.

In the conventional shielding structure of the shielding electric wire 52, however, the junction faces 50a and 51a of the two resin members 50 and 51 are simply butted against each other. For this reason, there is a possibility that a shift might be caused between the two resin members 50 and 51 due to the ultrasonic vibration.

In order to solve the foregoing, it can be proposed that protruded portions are provided on the junction faces 50a and 51a of the two resin members 50 and 51 and holes are provided on the other junction faces 50a and 51a respectively to position the two resin members 50 and 51. In addition, it can be suggested that the bottom face side of the hole is set to be an inclined face and a vibration energy is caused to converge in such a manner that the tip face of the protruded portion is caused to come in line contact with the inclined face. By such a structure, the tip side of the protruded portion and the portion abutting thereon are promoted to be fused so that a sticking force between the two resin members 50 and 51 can be enhanced.

In the case in which a reaction force received from the inclined face by the tip face of the protruded portion is unbalanced in a transverse direction, however, there is generated a situation in which the protruded portion is broken due to the vibration in the application of the ultrasonic wave and the sticking force between the two resin members 50 and 51 is thus reduced. If the contact area (the line contact distance) of the tip face of the protruded portion and the inclined face in the hole is too small, moreover, a portion on which a vibration energy directly acts is reduced so that the sticking force between the two resin members 50 and 51 cannot be enhanced effectively.

Further, as shown in FIG. 17, however, in a state in which the shielding electric wire 52 and the ground wire 53 are interposed between the two resin members 50 and 51 in the execution of ultrasonic welding, only the arcuate channels 50b and 51b of the resin members 50 and 51 are fitted to the shielding electric wire 52 and the ground wire 53 and electric wire peripheral faces 50c and 51c provided on peripheral edges thereof are separated from each other. Accordingly, a vibration energy in the application of an ultrasonic wave converges on only the shielding electric wire 52 and the ground wire 53 until the ultrasonic welding progresses so that the electric wire peripheral faces 50c and 51c are fitted to each other. When the vibration energy excessively converges, thus, an insulating inner cover 52b of the shielding electric wire 52 is also fused and an interval between the core 52a and the braided wire 52c is not sufficiently maintained so that the insulating performance of the shielding electric wire 52 is deteriorated. In the worst case, there is a possibility that the core 52a and the braided wire 52c might be short-circuited.

In the conventional shielding structure of the shielding electric wire 52, moreover, the junction faces 50a and 51a of the two resin members 50 and 51 are simply butted against each other. For this reason, there is a possibility that a shift might be caused between the two resin members 50 and 51 due to the ultrasonic vibration.

In order to solve the foregoing, it can be proposed that protruded portions are provided on the junction faces 50a and 51a of the two resin members 50 and 51 and holes are provided on the other junction faces 50a and 51a respectively to position the two resin members 50 and 51. By such a structure, the two resin members 50 and 51 can be prevented from being shifted from each other, and furthermore, the tip of the protruded portion and the bottom face portion of the hole are fused so that a sticking force between the two resin members 50 and 51 can be enhanced.

When the electric wire abutment faces of the arcuate channels 50b and 51b of the resin members 50 and 51 are not fitted to the shielding electric wire 52 and the ground wire 53 but only the protruded portion is set to be fitted to the bottom face of the hole in the state in which the shielding electric wire 52 and the ground wire 53 are interposed between the two resin members 50 and 51, however, the vibration energy in the application of the ultrasonic wave converges on only the protruded portion, resulting in the generation of a situation in which the protruded portion is broken. Consequently, the sticking force between the two resin members 50 and 51 is reduced. As a result, an electric wire holding force is decreased.

SUMMARY OF THE INVENTION

Therefore, the invention has been made to solve the problems and has an object to provide a shielding structure of a shielding electric wire which can prevent a protruded portion from being broken in the application of an ultrasonic wave and can increase a portion on which a vibration energy directly acts through the protruded portion, and can enhance a sticking force between two resin members.

Another object to provide a shielding structure of a shielding electric wire which can prevent drawbacks from being caused by the excessive convergence of a vibration energy in the application of an ultrasonic wave on the shielding electric wire or a protruded portion, thereby improving the insulating performance of the shielding electric wire, and furthermore, enhancing an electric wire holding force.

A first aspect of the invention is directed to a shielding structure of a shielding electric wire in which a shielding electric wire obtained by covering an outer periphery of a core with a shielding member and a ground wire are interposed between two resin members, and a compressive force is caused to act on the two resin members and an ultrasonic wave is simultaneously applied to fuse the resin portions, thereby forming a contact portion of the shielding member of the shielding electric wire and a core of the ground wire, wherein a protruded portion is provided on one of junction faces of the two resin members and a hole including a protrusion inserting portion for inserting the protruded portion and a resin inflow portion provided in an inner position from the protrusion inserting portion and having a smaller width than a width of the protrusion inserting portion is provided on the other junction face, and either ends on both sides of a tip face of the protruded portion or step faces at both sides on a boundary between the protrusion inserting portion and the resin inflow portion in the hole are formed to be inclined faces.

In the shielding structure of the shielding electric wire, the tip face of the protruded portion abuts on the step face in the hole in a symmetrical position in line contact, and a reaction force received from the step face by the protruded portion is transversely uniform. Consequently, the protruded portion can be prevented from being broken when the ultrasonic wave is applied, and furthermore, the contact area of the tip face of the protruded portion and the inclined face in the hole is increased, resulting in an increase in a portion on which a vibration energy directly acts through the protruded portion.

A second aspect of the invention is directed to the shielding structure of the shielding electric wire according to the first aspect of the invention, wherein the inclined face is formed on the step face side of the boundary between the protrusion inserting portion and the resin inflow portion in the hole.

In the shielding structure of the shielding electric wire, it is possible to obtain the same functions as those in the first aspect of the invention.

A third aspect of the invention is directed to the shielding structure of the shielding electric wire according to the first aspect of the invention, wherein a pair of step faces is formed in opposed positions to each other on the boundary between the protrusion inserting portion and the resin inflow portion and is provided to be the inclined faces.

In the shielding structure of the shielding electric wire, it is possible to obtain the same functions as those in the first aspect of the invention.

A fourth aspect of the invention is directed to the shielding structure of the shielding electric wire according to the first aspect of the invention, wherein the step faces are formed over a whole periphery on the boundary between the protrusion inserting portion and the resin inflow portion and all of the step faces are formed to be the inclined faces.

In the shielding structure of the shielding electric wire, in addition to the functions of the first aspect of the invention, the reaction force received from the inclined face by the tip face of the protruded portion is distributed more uniformly, and furthermore, the contact area of the tip face of the protruded portion and the inclined face in the hole is further increased.

A fifth aspect of the invention is directed to the shielding structure of the shielding electric wire according to the first aspect of the invention, wherein the inclined face is formed on the tip face side of the protruded portion.

In the shielding structure of the shielding electric wire, in addition to the functions of the first aspect of the invention, the protruded portion can be smoothly inserted into the hole by the inclined face of the tip face of the protruded portion even if the two resin members are slightly shifted from each other.

A sixth aspect of the invention is directed to the shielding structure of the shielding electric wire according to the fifth aspect of the invention, wherein the tip face of the protruded portion has a pair of ends opposed to each other which is formed to be the inclined faces.

In the shielding structure of the shielding electric wire, it is possible to obtain the same functions as those in the fifth aspect of the invention.

A seventh aspect of the invention is directed to the shielding structure of the shielding electric wire according to the fifth aspect of the invention, wherein the tip face of the protruded portion has all of the ends opposed to each other which are formed to be the inclined faces.

In the shielding structure of the shielding electric wire, in addition to the functions of the fifth aspect of the invention, the reaction force received from the inclined face by the tip face of the protruded portion is distributed more uniformly, and furthermore, the contact area of the tip face of the protruded portion and the inclined face in the hole is further increased.

An eighth aspect of the invention is directed to the shielding structure of the shielding electric wire according to the first aspect of the invention, wherein each of the resin members is provided with the protruded portion on a first diagonal line passing through a virtual center and in a position placed apart from the virtual center at an equal distance and the hole on a second diagonal line passing through the virtual center and in a position placed apart from the virtual center at an equal distance.

In the shielding structure of the shielding electric wire, in addition to the functions of the first to seventh aspects of the invention, it is possible to use the same components for the two resin members.

As described above, according to the first aspect of the invention, a protruded portion is provided on one of junction faces of the two resin members and a hole including a protrusion inserting portion for inserting the protruded portion and a resin inflow portion provided in an inner position from the protrusion inserting portion and having a smaller width than a width of the protrusion inserting portion is provided on the other junction face, and either ends on both sides of a tip face of the protruded portion or step faces at both sides on a boundary between the protrusion inserting portion and the resin inflow portion in the hole are formed to be inclined faces. Therefore, the tip face of the protruded portion abuts on the step face in the hole in line contact in a symmetrical position and the reaction force received from the step face by the protruded portion is transversely uniform. Consequently, it is possible to reliably prevent the protruded portion from being broken in the application of an ultrasonic wave, and furthermore, it is possible to increase the contact area of the tip face of the protruded portion and the inclined face in the hole, thereby increasing the portion on which a vibration energy directly acts through the protruded portion. Thus, a sticking force between the two resin members can be enhanced.

According to the second aspect of the invention, the inclined face is formed on the step face side of the boundary between the protrusion inserting portion and the resin inflow portion in the hole. Consequently, it is possible to obtain the same advantages than those of the first aspect of the invention.

According to the third aspect of the invention, a pair of step faces is formed in opposed positions to each other on the boundary between the protrusion inserting portion and the resin inflow portion and is provided to be the inclined faces. Consequently, it is possible to obtain the same advantages than those of the first aspect of the invention.

According to the fourth aspect of the invention, the step faces are formed over a whole periphery on the boundary between the protrusion inserting portion and the resin inflow portion and all of the step faces are formed to be the inclined faces. Consequently, the reaction force received from the inclined face by the tip face of the protruded portion is distributed more uniformly, and furthermore, the contact area of the tip face of the protruded portion and the inclined face in the hole is further increased. Consequently, the sticking force between the two resin members can further be enhanced.

According to the fifth aspect of the invention, the inclined face is formed on the tip face side of the protruded portion. Even if the two resin members are slightly shifted from each other, therefore, the protruded portion can smoothly be inserted in the hole by the inclined face of the tip face of the protruded portion. Consequently, it is possible to enhance a butting workability between the two resin members.

According to the sixth aspect of the invention, the tip face of the protruded portion has a pair of ends opposed to each other which is formed by the inclined faces. Therefore, it is possible to obtain the same advantages as those of the fifth aspect of the invention.

According to the seventh aspect of the invention, the tip face of the protruded portion has all of the ends opposed to each other which are formed by the inclined faces. In addition to the advantages according to the fifth aspect of the invention, therefore, the reaction force received from the inclined face by the tip face of the protruded portion is distributed further uniformly. Moreover, the contact area of the tip face of the protruded portion and the inclined face in the hole is further increased. Consequently, it is possible to further enhance the sticking force between the two resin members.

According to the eighth aspect of the invention, each of the resin members is provided with the protruded portion on a first diagonal line passing through a virtual center and in a position placed apart from the virtual center at an equal distance and the hole on a second diagonal line passing through the virtual center and in a position placed apart from the virtual center at an equal distance. Therefore, it is possible to use the same components for the two resin members.

A ninth aspect of the invention is directed to a shielding structure of a shielding electric wire in which a shielding electric wire obtained by covering an outer periphery of a core with a shielding member and a ground wire are interposed between two resin members, and a compressive force is caused to act on the two resin members and an ultrasonic wave is simultaneously applied to fuse the resin portions, thereby forming a contact portion of the shielding member of the shielding electric wire and a core of the ground wire, wherein a junction face of each of the resin members is provided with an electric wire abutment face on which the shielding electric wire and the ground wire abut, and an electric wire peripheral face around the electric wire abutment face, and a protruded portion is provided on one of the resin members and a hole for inserting the protruded portion is provided on the other resin member, and both of the electric wire abutment faces are fitted to the shielding electric wire and the ground wire and at least one of a portion between both of the electric wire peripheral faces and a portion between the protruded portion and a bottom face of the hole is set into a fitting condition in a state in which the shielding electric wire and the ground wire are interposed between the two resin members.

In the shielding structure of the shielding electric wire, when the application of the ultrasonic wave is started, a vibration energy directly acts on the electric wire abutment face and other portions from the beginning of the application. Therefore, it is possible to prevent a deterioration in an insulating performance from being caused by the excessive convergence of the vibration energy in the application of the ultrasonic wave on the shielding electric wire. Moreover, it is possible to prevent the breakage of the protruded portion from being caused by the excessive convergence of the vibration energy in the application of the ultrasonic wave on the protruded portion.

A tenth aspect of the invention is directed to the shielding structure of the shielding electric wire according to the first aspect of the invention, wherein the portion between both of the electric wire peripheral faces and the portion between the protruded portion and the bottom face of the hole are set into the fitting condition in the state in which the shielding electric wire and the ground wire are interposed between the two resin members.

In the shielding structure of the shielding electric wire, when the application of the ultrasonic wave is started, the vibration energy directly acts on the electric wire abutment face, the electric wire peripheral face, and the protruded portion and the bottom face of the hole and is thus distributed from the beginning of the application. Accordingly, the vibration energy converges on neither only the electric wire abutment face nor only the protruded portion and the bottom face of the hole.

An eleventh aspect of the invention is directed to the shielding structure of the shielding electric wire according to the first aspect of the invention, wherein the portion between both of the electric wire peripheral faces is set into the fitting condition and the portion between the protruded portion and the bottom face of the hole is set into a separating condition in the state in which the shielding electric wire and the ground wire are interposed between the two resin members.

In the shielding structure of the shielding electric wire, when the application of the ultrasonic wave is started, the vibration energy directly acts on the electric wire abutment face and the electric wire peripheral face and is thus distributed at the beginning of the application. When the fusion of the resin progresses so that the protruded portion and the bottom face of the hole are fitted to each other, similarly, the vibration energy directly acts on the protruded portion and the bottom face of the hole and the fusion of the resin in that portion is thus started. Accordingly, the vibration energy converges on neither only the electric wire abutment face nor the protruded portion and the bottom face of the hole.

A twelfth aspect of the invention is directed to the shielding structure of the shielding electric wire according to the first aspect of the invention, wherein the portion between both of the electric wire peripheral faces is set into a separating condition and the portion between the protruded portion and the bottom face of the hole is set into the fitting condition in the state in which the shielding electric wire and the ground wire are interposed between the two resin members.

In the shielding structure of the shielding electric wire, when the application of the ultrasonic wave is started, the vibration energy directly acts on the electric wire abutment face, and the protruded portion and the bottom face of the hole and is thus distributed at the beginning of the application. When the fusion of the resin progresses so that the electric wire peripheral faces are fitted to each other, similarly, the vibration energy directly acts on the electric wire peripheral faces and the fusion of the resin in that portion is thus started. Accordingly, the vibration energy converges on neither only the electric wire abutment face nor only the protruded portion and the bottom face of the hole.

As described above, according to the ninth aspect of the invention, both of the electric wire abutment faces are fitted to the shielding electric wire and the ground wire and at least one of a portion between both of the electric wire peripheral faces and a portion between the protruded portion and a bottom face of the hole is set into a fitting condition in a state in which the shielding electric wire and the ground wire are interposed between the two resin members. When the application of the ultrasonic wave is started, therefore, a vibration energy directly acts on the electric wire abutment face and other portions from the beginning of the application. Consequently, it is possible to prevent a deterioration in an insulating performance from being caused by the excessive convergence of the vibration energy in the application of the ultrasonic wave on the shielding electric wire. Accordingly, the insulating performance of the shielding electric wire can be enhanced. Moreover, it is possible to prevent the breakage of the protruded portion from being caused by the excessive convergence of the vibration energy in the application of the ultrasonic wave on the protruded portion. Consequently, a sticking force between the two resin members can be increased. As a result, an electric wire holding force can be enhanced.

According to the tenth aspect of the invention, the portion between both of the electric wire peripheral faces and the portion between the protruded portion and the bottom face of the hole are set into the fitting condition in the state in which the shielding electric wire and the ground wire are interposed between the two resin members. When the application of the ultrasonic wave is started, therefore, the vibration energy directly acts on the electric wire abutment face, the electric wire peripheral face, and the protruded portion and the bottom face of the hole and is thus distributed from the beginning of the application. Consequently, the vibration energy converges on neither only the electric wire abutment face nor only the protruded portion and the bottom face of the hole. Thus, the insulating performance of the shielding electric wire can be enhanced and the electric wire holding force can be improved.

According to the eleventh aspect of the invention, the portion between both of the electric wire peripheral faces is set into the fitting condition and the portion between the protruded portion and the bottom face of the hole is set into a separating condition in the state in which the shielding electric wire and the ground wire are interposed between the two resin members. When the application of the ultrasonic wave is started, therefore, the vibration energy directly acts on the electric wire abutment face and the electric wire peripheral face and is thus distributed at the beginning of the application. When the fusion of the resin progresses so that the protruded portion and the bottom face of the hole are fitted to each other, similarly, the vibration energy directly acts on the protruded portion and the bottom face of the hole and the fusion of the resin in that portion is thus started. Consequently, the vibration energy converges on neither only the electric wire abutment face nor only the protruded portion and the bottom face of the hole. Thus, the insulating performance of the shielding electric wire can be enhanced and the electric wire holding force can be improved.

According to the twelfth aspect of the invention, the portion between both of the electric wire peripheral faces is set into a separating condition and the portion between the protruded portion and the bottom face of the hole is set into the fitting condition in the state in which the shielding electric wire and the ground wire are interposed between the two resin members. When the application of the ultrasonic wave is started, therefore, the vibration energy directly acts on the electric wire abutment face, and the protruded portion and the bottom face of the hole and is thus distributed at the beginning of the application. When the fusion of the resin progresses so that the electric wire peripheral faces are fitted to each other, similarly, the vibration energy directly acts on the electric wire peripheral faces and the fusion of the resin in that portion is thus started. Consequently, the vibration energy converges on neither only the electric wire abutment face nor only the protruded portion and the bottom face of the hole. Thus, the insulating performance of the shielding electric wire can be enhanced and the electric wire holding force can be improved.

BRIEF DESCRIPTION OF THE DRAWINGS

FIG. 13(*b*) being a perspective view showing a resin member to be provided in a lower position conventional art;

DETAILED DESCRIPTION OF THE PREFERRED EMBODIMENTS

Embodiments of the invention will be described below with reference to the drawings.

Figure 1:
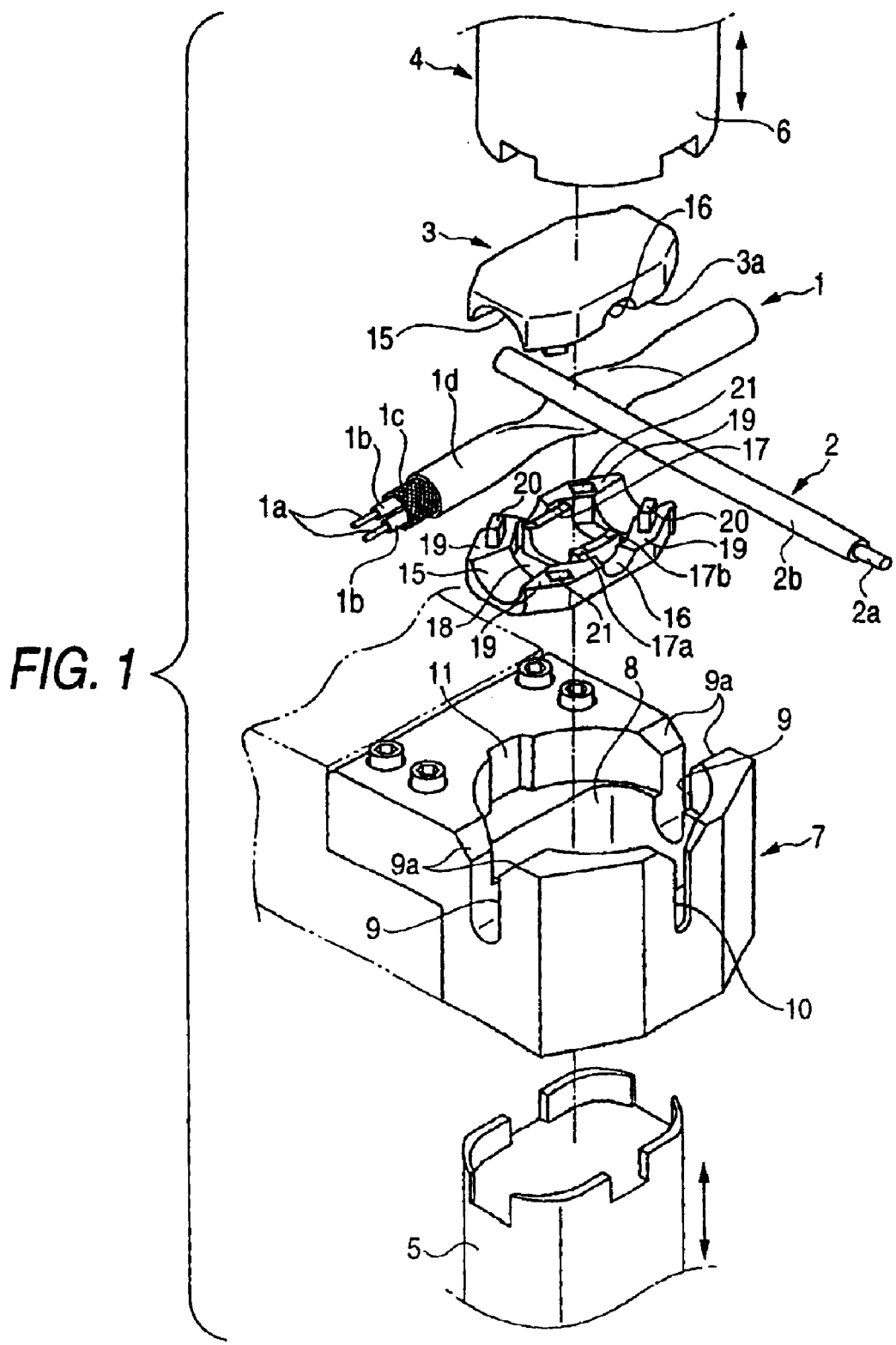
FIG. 1 is an exploded perspective view for explaining a shielding method according to a first embodiment of the invention.

As shown in FIG. 1, a shielding electric wire 1 is constituted by two cores 1*a* and 1*a* which are twisted, insulating inner covers 1*b* and 1*b* formed by a resin material which cover the outer peripheries of the cores 1*a* and 1*a* respectively, a braided wire 1*c* to be a shielding member for covering the outer peripheries of the insulating inner covers 1*b* and 1*b*, and an insulating outer cover 1*d* formed by a resin material which covers the outer periphery of the braided wire 1*c*.

A ground wire 2 is constituted by a core 2*a* and an insulating outer cover 2*b* formed by a resin material which covers the outer periphery of the core 2*a*.

As shown in FIGS. 1 to 7, a pair of resin members 3 and 3 are identical components, and junction faces 3*a* and 3*a* are provided with an electric wire abutment face 16 on which the shielding electric wire 1 and the ground wire 2 abut, respectively. The electric wire abutment face 16 is constituted by a semicircular channel-shaped arcuate face 16*a* for the shielding electric wire which is extended in a straight direction, and an arcuate face 16*b* for the ground wire which is extended in an orthogonal direction to the arcuate face 16*a* for the shielding electric wire. An electric wire peripheral face 17 is formed around the central part of the electric wire abutment face 16, and a resin inflow concave portion 18 is formed over a whole periphery on the outer peripheral side of the electric wire peripheral face 17. A fused resin flows from the electric wire abutment face 16 and the electric wire peripheral face 17 into the resin inflow concave portion 18. Consequently, the fused resin is prevented from flowing out of the pair of upper and lower resin members 3 and 3.

Figure 2:
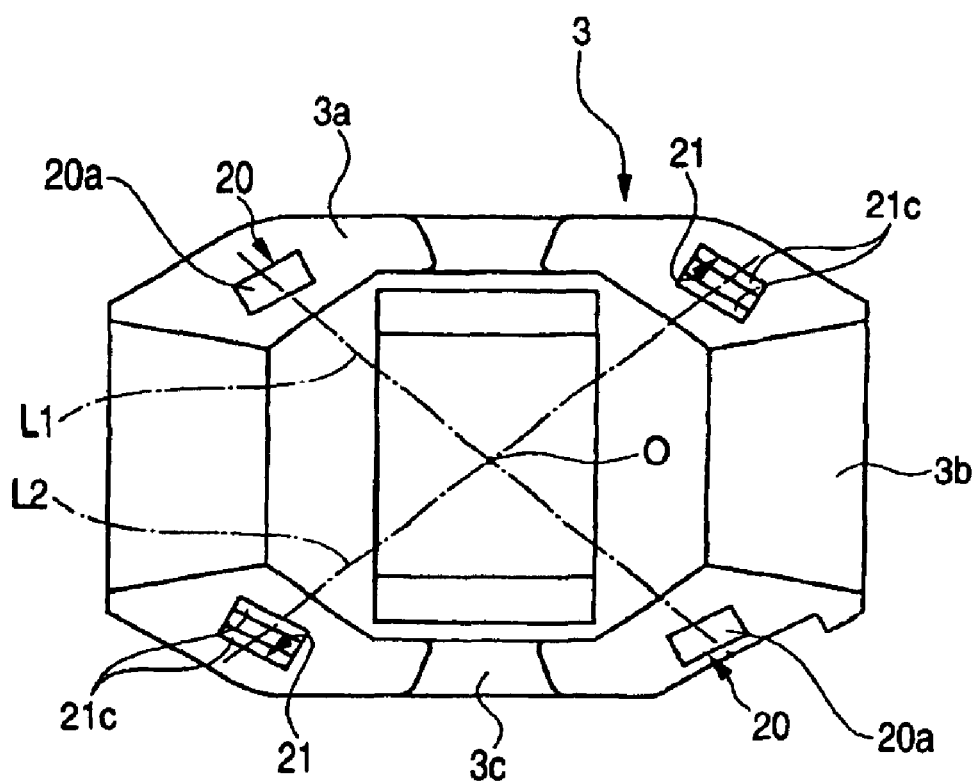
FIG. 2 is a plan view showing a resin member according to the first embodiment of the invention.

As shown in FIG. 2, moreover, protruded portions 20 and 20 are provided on a first diagonal line L1 passing through a virtual center O of each of the junction faces 3*a* and 3*a* and in positions placed apart from the virtual center O at equal distances, respectively. Holes 21 and 21 are provided on a second diagonal line L2 passing through the virtual center O and in positions placed apart from the virtual center O at equal distances, respectively. More specifically, when the mutual junction faces 3*a* and 3*a* of the resin members 3 and 3 are butted against each other, the protruded portions 20 of the resin members 3 and 3 are inserted in the holes 21 on the other party side respectively and are thus assembled.

Figure 3:
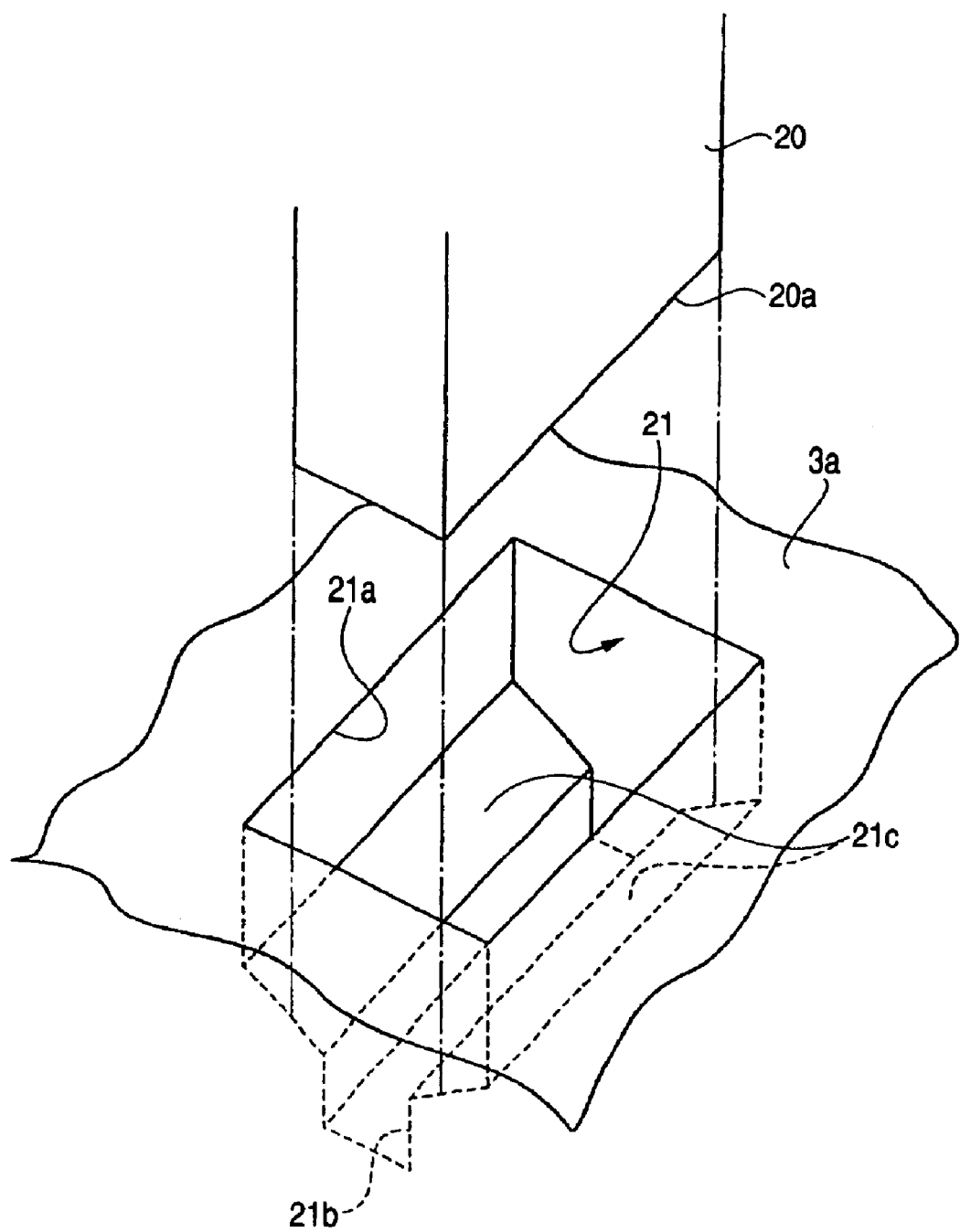
FIG. 3 is a perspective view showing a protruded portion and a hole according to the first embodiment of the invention.
Figure 4:
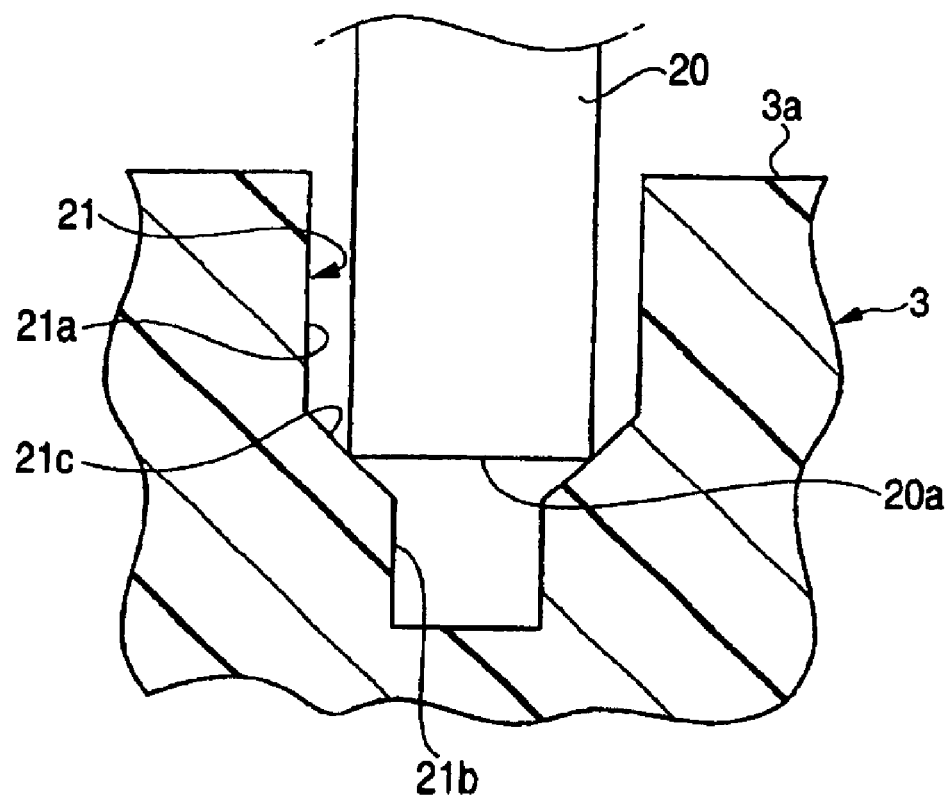
FIG. 4 is a sectional view showing a state in which the protruded portion abuts on an inclined face in the hole according to the first embodiment of the invention.
Figure 5:
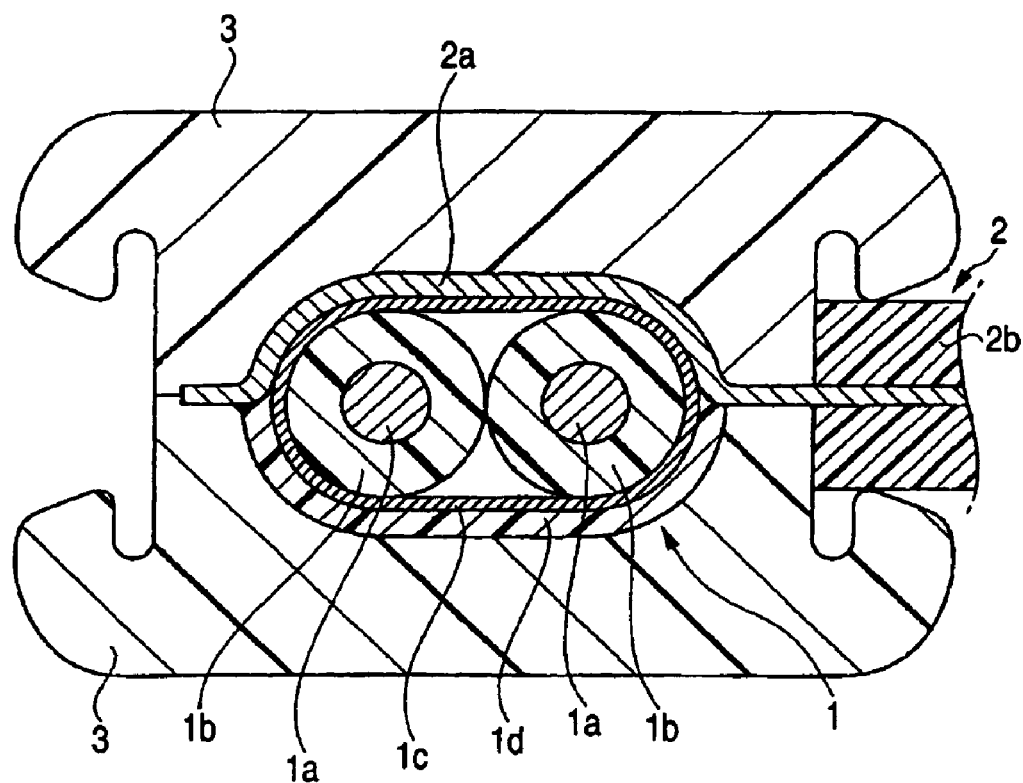
FIG. 5 is a sectional view showing an ultrasonic welding portion according to the first embodiment of the invention.

As shown in FIGS. 3 and 4, each protruded portion 20 is formed to have a rectangular sectional shape. The protruded portion 20 is inserted in each hole 21 and is constituted by a rectangular protrusion inserting portion 21*a* and a resin inflow portion 21*b* provided in an inner position from the protrusion inserting portion 21*a* and having a smaller width than the width of the protrusion inserting portion 21*a*. A pair of step faces is formed in opposed positions to each other on the boundary between the protrusion inserting portion 21*a* and the resin inflow portion 21*b*, and is provided on inclined faces 21*c* and 21*c*. The inclined faces 21*c* and 21*c* are formed in such a manner that an inside is inclined downward in the inner direction of an insertion.

An outer edge face 19 is formed in four positions on diagonal lines at the outside of the resin inflow concave portion 18 respectively. A protruded portion 20 is provided on each of the outer edge faces 19 on one of the diagonal lines and a hole 21 is provided on each of the outer edge faces 19 on the other diagonal line. More specifically, when the mutual junction faces 3a and 3a of the resin members 3 and 3 are butted against each other, the protruded portions 20 of both of the resin members 3 and 3 are inserted into the holes 21 respectively and are thus assembled.

Figure 7:
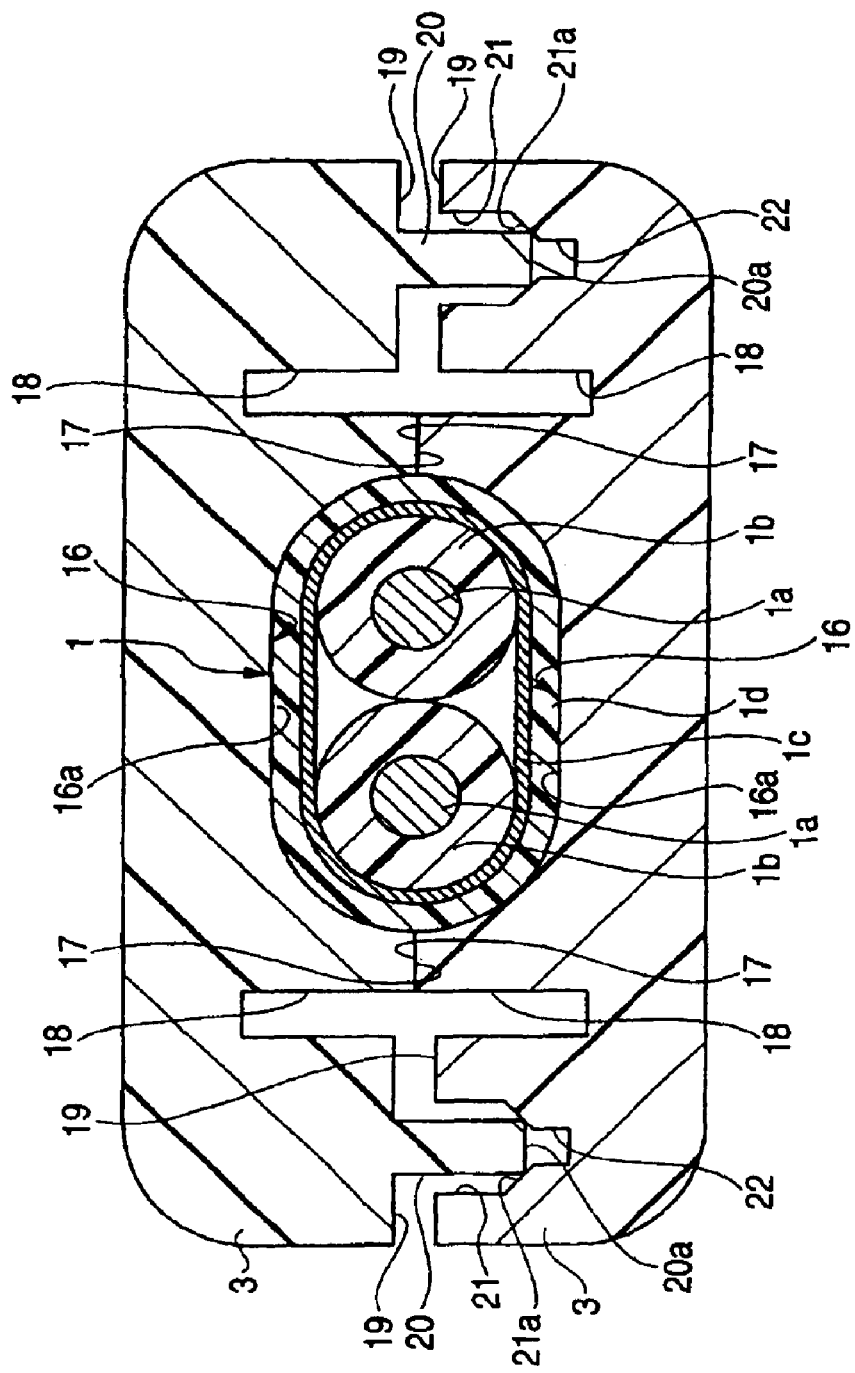
FIG. 7 is a sectional view showing a state in which a shielding electric wire and a ground wire are interposed between two resin members in the application of an ultrasonic wave according to the first embodiment of the invention.

As shown in FIG. 7, a resin inflow channel 22 is formed on an inner part from a bottom face 21*a* of the hole 21. A fused resin flows from the protruded portion 20 into the resin inflow channel 22. Consequently, the fused resin is prevented from flowing out of the upper and lower resin members 3 and 3. The bottom face 21*a* of the hole 21 is formed as an inclined face and a tip face 20*a* of the protruded portion 20 abuts on the bottom face 21*a* in line contact.

When an ultrasonic wave is to be applied, moreover, setting is carried out in such a manner that both of the electric wire abutment faces 16 and 16 are brought into a fitting state to the shielding electric wire 1 and the ground wire 2 (a section in a position in which the ground wire 2 is not provided in FIG. 7), and a portion between both of the electric wire peripheral faces 17 and 17 and a portion between the tip face 20*a* of the protruded portion 20 and the bottom face 21*a* of the hole 21 are brought into the fitting state as shown in FIG. 7 in a state in which the shielding electric wire 1 and the ground wire 2 are interposed between the resin members 3 and 3.

Figure 6:
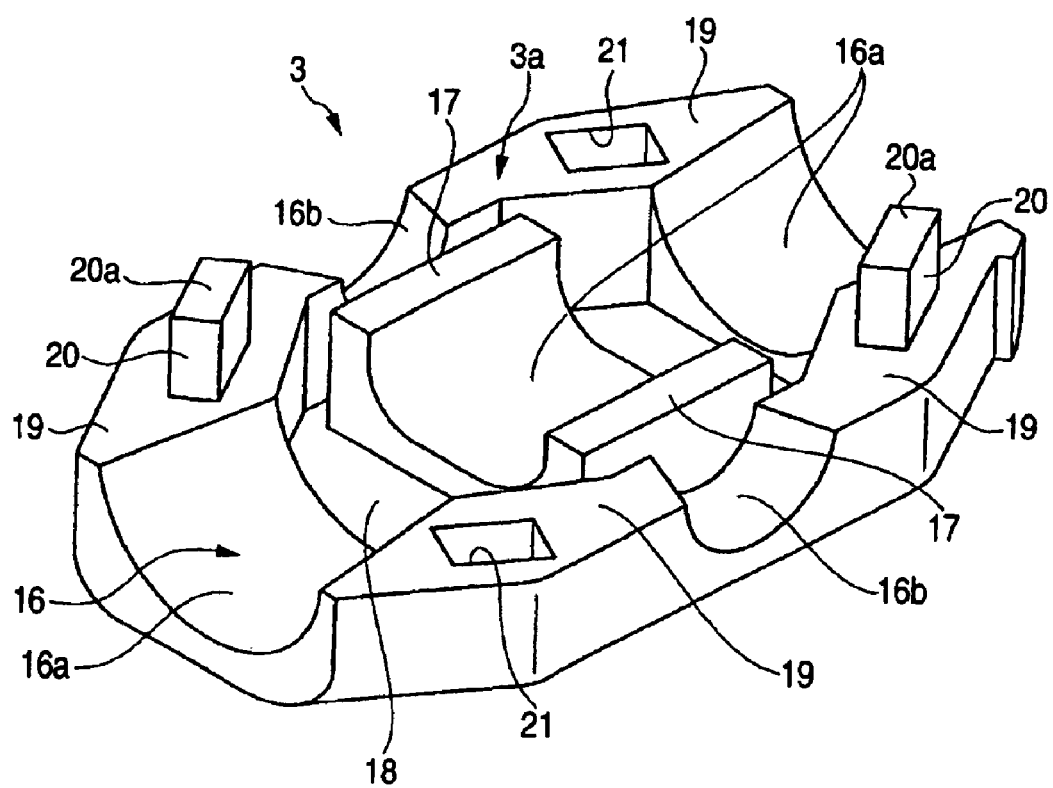
FIG. 6 is a perspective view showing a resin member according to the first embodiment of the invention.

As shown in FIG. 6, an ultrasonic horn 4 is constituted by a lower support base 5 and an ultrasonic horn body 6 provided just above the lower support base 5 and serving to generate an ultrasonic vibration. The lower support base 5 and the ultrasonic horn body 6 are separately provided movably in a vertical direction. The resin member 3 is set to the upper face of the lower support base 5. The resin member 3 thus set is held with the junction face 3*a* turned upward. The resin member 3 is set to the lower face of the ultrasonic horn body 6. The resin member 3 thus set is held with the junction face 3*a* turned downward.

A jig 7 for a shielding process has an opening portion 8 for installing a resin which penetrates in a vertical direction, and is provided with a pair of electric wire inserting channels 9 and 9 in left and right positions on the outside of the opening portion 8 for installing a resin. The electric wire inserting channels 9 and 9 are provided in positions at a half interval (P/2) of a twisting pitch P of the cores 1*a* and 1*a*, and furthermore, are set to have such a width as to permit an insertion in only positions in which the two twisted cores 1*a* and 1*a* are arranged longitudinally in parallel. The twisting pitch P in the embodiment is approximately 30 mm. The inlets of the electric wire inserting channels 9 and 9 are formed to be taper faces 9*a* and 9*a* having widths reduced gradually in the direction of the insertion of an electric wire.

Moreover, the jig 7 for a shielding process is provided with a ground wire inserting channel 10 and a reference concave portion 11 in the outside position of the opening portion 8 for installing a resin and in an orthogonal direction to a line connecting the electric wire inserting channels 9 and 9 respectively. The ground wire 2 inserted through the ground wire inserting channel 10 is set into an almost central position between the electric wire inserting channels 9 and 9.

Next, description will be given to a shielding method using the jig 7 for a shielding process.

As shown in FIG. 1, the upper and lower resin members 3 and 3 are set onto the lower face of the ultrasonic horn body 6 and the upper face of the lower support base 5, respectively. Moreover, the shielding electric wire 1 is inserted into the electric wire inserting channels 9 and 9 of the jig 7 for a shielding process. The shielding electric wire 1 is inserted in the electric wire inserting channels 9 and 9 in only positions in which the twisted cores 1a and 1a are provided longitudinally in parallel.

Next, the ground wire 2 is inserted into the ground wire inserting channel 10 of the jig 7 for a shielding process up to a position in which the tip of the ground wire 2 abuts on the reference concave portion 11. Consequently, the ground wire 2 almost comes in contact with the upper face of the shielding electric wire 1 and is provided in such a state as to cross the shielding electric wire 1.

Subsequently, the ground wire 2 is pulled back by a predetermined dimension in such a manner that the tip of the ground wire 2 is not protruded from the upper and lower resin members 3 and 3, and furthermore, a lower support base 5 and an ultrasonic horn body 6 are moved to upper and lower parts respectively, thereby causing the upper and lower resin members 3 and 3 to be butted against each other at the mutual junction faces 3a and 3a. Consequently, the upper and lower resin members 3 and 3 interpose the shielding electric wire 1 and the ground wire 2 therebetween so that the shielding electric wire 1 is fitted in the arcuate faces 16a and 16a for the shielding electric wire and the ground wire 2 is fitted in the arcuate faces 16b and 16b for the ground wire. Moreover, the protruded portions 20 of the resin members 3 and 3 are inserted in the hole 21 so that the resin members 3 and 3 are positioned. As shown in FIG. 4, edges on both sides of the tip face of the protruded portion 20 are caused to abut on the inclined faces 21c and 21c in the hole 21.

When a compressive force is caused to act between the ultrasonic horn body 6 and the lower support base 5 to apply an ultrasonic vibration, subsequently, the insulating outer cover 1d of the shielding electric wire 1 and the insulating outer cover 2b of the ground wire 2 are fused and scattered by the generation of heat through a vibration energy so that the core 2a of the ground wire 2 and the braided wire 1c of the shielding electric wire 1 are brought into a contact state. Moreover, each of the contact portions of the junction faces 3a and 3a of the resin members 3 and 3, the contact portion of the arcuate faces 16a and 16b for a shielding electric wire of the resin members 3 and 3 and the insulating outer cover 1d of the shielding electric wire 1, and the contact portion of the arcuate faces 16b and 16b for a ground wire of the resin members 3 and 3 and the insulating outer cover 2b of the ground wire 2 are fused by the generation of heat through the vibration energy, and the fused portions are solidified after the application of the ultrasonic wave is completed. Consequently, the upper and lower resin members 3 and 3, the shielding electric wire 1 and the ground wire 2 are fixed to each other (see FIG. 5).

Next, description will be given to the transmission of a vibration energy and the fusion of a resin in the protruded portion 20 and the inclined faces 21c and 21c in the hole 21 between the resin members 3 and 3. As shown in FIG. 4, the edges on both sides of a tip face 20a of the protruded portion 20 and the inclined faces 21c and 21c abut on each other in line contact. Therefore, the abutment portion acts as a path for transmitting the vibration energy so that the protruded portion 20 receives a reaction force from the inclined faces 21c and 21c. The reaction force received from the inclined faces 21c and 21c by the tip face 20a of the protruded portion 20 is transversely uniform. Consequently, it is possible to reliably prevent the protruded portion 20 from being broken when applying an ultrasonic wave. Moreover, the contact area (line contact distance) of the tip face 20a of the protruded portion 20 and the inclined faces 21c and 21c in the hole 21 is larger than that in the conventional art. Therefore, it is possible to increase a portion on which the vibration energy directly acts through the protruded portion 20. Consequently, a sticking force between the resin members 3 and 3 can be enhanced. Moreover, a resin fused in the hole 21 flows into the resin inflow portion 21b and does not flow out. Therefore, it is possible to reliably prevent the insulating outer covers 1d and 2b of the shielding electric wire 1 and the ground wire 2 from being partially broken by the fused resin.

Moreover, each resin member is provided with the protruded portions 20 and 20 on the first diagonal line L1 passing through the virtual center O and in the positions placed apart from the virtual center O at the equal distances and the holes 21 and 21 on the second diagonal line L2 passing through the virtual center O and in the positions placed apart from the virtual center O at the equal distances. Therefore, the same components can be used as the resin members 3 and 3.

Next, description will be given to the details of the transmission of the vibration energy in the application of the ultrasonic wave.

In a state in which the shielding electric wire 1 and the ground wire 2 are interposed between the upper and lower resin members 3 and 3, both of the electric wire abutment faces 16 and 16 are fitted to the shielding electric wire 1 and the ground wire 2, and furthermore, a portion between both of the electric wire peripheral faces 17 and 17 and a portion between the tip face 20a of the protruded portion 20 and the bottom face 21a of the hole 21 are set into a fitting state as shown in FIG. 3. When the application of the ultrasonic wave is started, accordingly, the vibration energy directly acts on the electric wire abutment faces 16 and 16, the electric wire peripheral faces 17 and 17, and the tip face 20a of the protruded portion 20 and the bottom face 21a of the hole 21 and is thus distributed from the beginning of the application. In other words, the vibration energy does not converge on only the electric wire abutment faces 16 and 16. Therefore, the insulating inner cover 1b of the shielding electric wire 1 is not fused so that an interval between the cores 1a and 1a and the braided wire 1c can be maintained sufficiently. Moreover, the vibration energy does not converge on only the tip face 20a of the protruded portion 20 and the bottom face 21a of the hole 21. Consequently, the protruded portion 20 is prevented from being broken and a sticking force between the upper and lower resin members 3 and 3 can be increased. Thus, the insulating performance of the shielding electric wire 1 can be improved and an electric wire holding force can be enhanced.

Moreover, the resin fused on the junction faces 3a and 3a which are opposed to each other flows into the resin inflow concave portion 18 and does not flow out, and furthermore, a resin fused in the hole 21 flows into the resin inflow channel 22 and does not flow out. Accordingly, it is possible to prevent the insulating outer covers 1*d* and 2*b* of the shielding electric wire 1 and the ground wire 2 from being partially broken by the fused resin.

Figure 8:
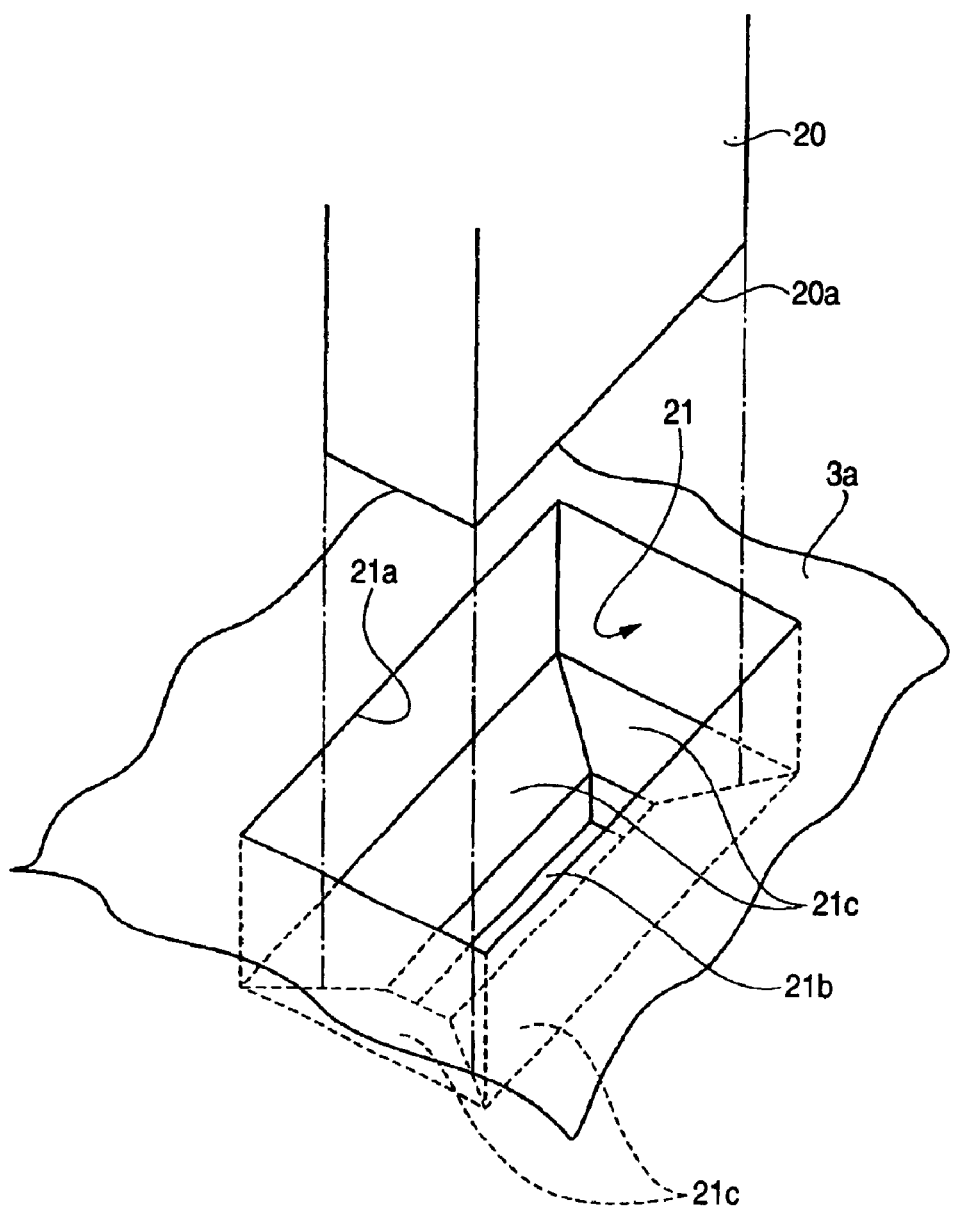
FIG. 8 is a perspective view showing a protruded portion and a hole according to a second embodiment of the invention.

FIG. 8 is a perspective view showing a protruded portion 20 and a hole 21 according to a second embodiment.

As shown in FIG. 8, the second embodiment is different from the first embodiment in that step faces (that is, two pairs of step faces opposed to each other) are formed over a whole periphery on a boundary between a protrusion inserting portion 21*a* and a resin inflow portion 21*b* and are provided on inclined surfaces 21*c*. Since other structures are identical, detailed description will be omitted.

In the second embodiment, a reaction force received from the inclined face 21*c* by a tip face 20*a* of the protruded portion 20 is distributed more uniformly and the contact area (line contact distance) of the tip face 20*a* of the protruded portion 20 and the inclined face 21*c* in the hole 21 is further increased. Consequently, a sticking force between two resin members can further be enhanced.

Figure 9:
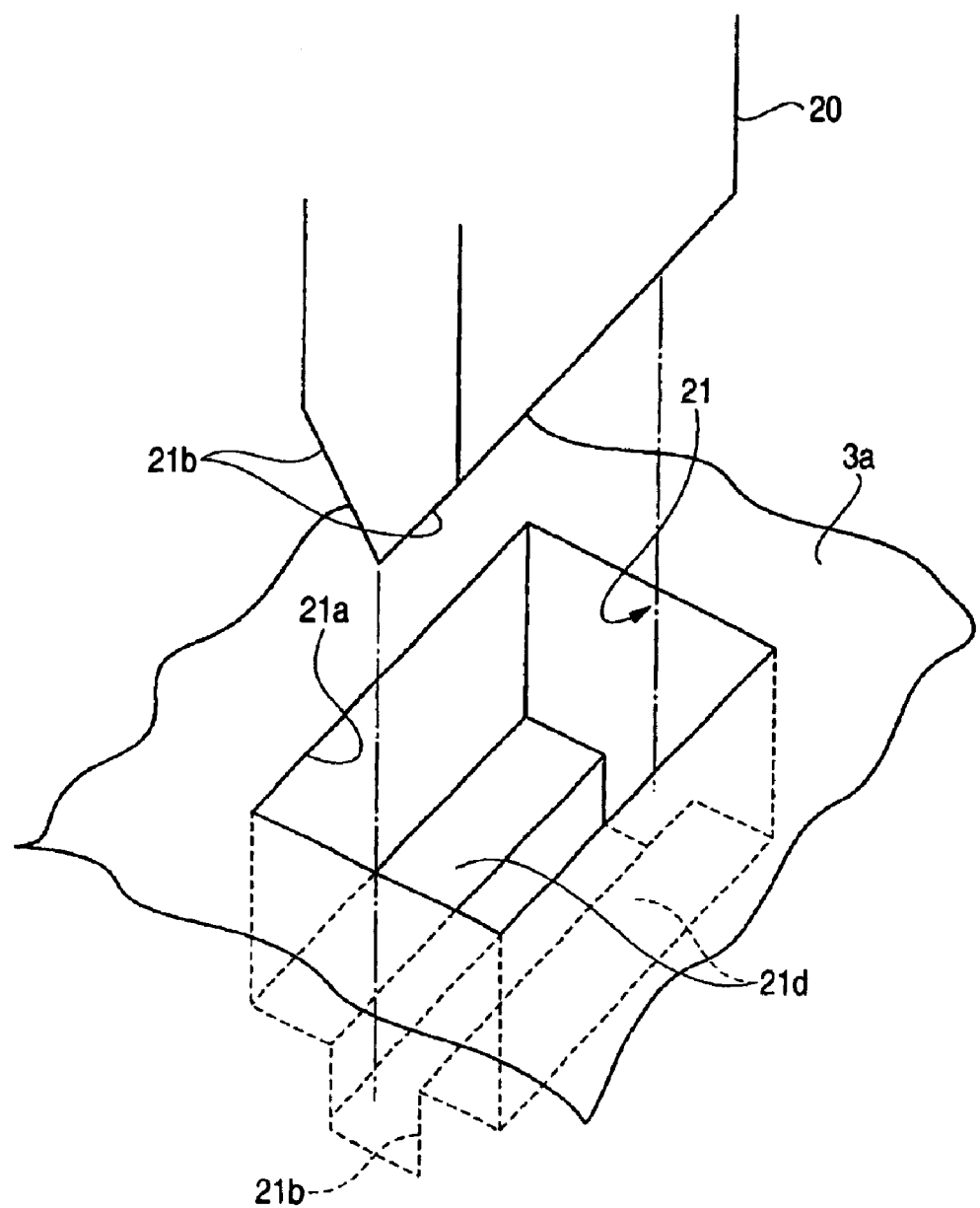
FIG. 9 is a perspective view showing a protruded portion and a hole according to a third embodiment of the invention.
Figure 10:
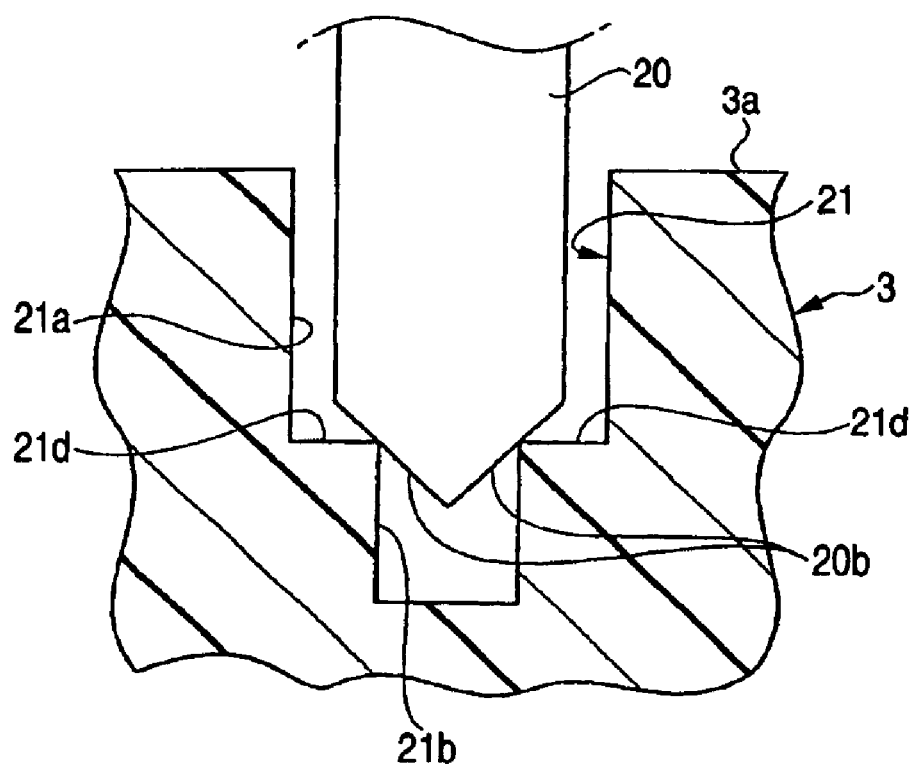
FIG. 10 is a sectional view showing a state in which the inclined face of the protruded portion abuts on a horizontal flat face in the hole according to the third embodiment of the invention.

FIGS. 9 and 10 show a third embodiment, and FIG. 9 is a perspective view showing a protruded portion 20 and a hole 21 and FIG. 10 is a sectional view showing a state in which an inclined face 20*b* of the protruded portion 20 abuts on a horizontal flat face 21*d* in the hole 21.

As shown in FIGS. 9 and 10, in the third embodiment, a tip face 20*a* of the protruded portion 20 has a pair of ends opposed to each other which is formed to be the inclined faces 20*b* and 20*b*. The pair of inclined faces 20*b* and 20*b* is inclined in such a direction that a center side is gradually protruded down toward a tip. Moreover, a pair of step faces is formed on boundaries between protrusion inserting portions 21*a* and resin inflow portions 21*b* in the hole 21 and is provided to be the horizontal flat faces 21*d* and 21*d*.

In the third embodiment, as shown in FIG. 10, the inclined faces 20*b* and 20*b* of the tip face 20*a* of the protruded portion 20 abut on the edges of the horizontal flat faces 21*d* and 21*d* in the hole 21 in line contact. Therefore, the abutment portion acts as a path for transmitting a vibration energy so that the inclined faces 20*b* and 20*b* of the protruded portion 20 receive a reaction force from the horizontal flat faces 21*d* and 21*d*. In the same manner as in the first embodiment, the reaction force received from the inclined faces 20*b* and 20*b* of the protruded portion 20 is transversely uniform. Consequently, it is possible to reliably prevent the protruded portion 20 from being broken when applying an ultrasonic wave. Moreover, the contact area (line contact distance) of the inclined faces 20*b* and 20*b* of the protruded portion 20 and the horizontal flat faces 21*d* and 21*d* in the hole 21 is larger than that in the conventional art. Therefore, it is possible to increase a portion on which the vibration energy directly acts through the protruded portion 20. Consequently, a sticking force between resin members 3 and 3 can be enhanced. Moreover, a resin fused in the hole 21 flows into the resin inflow portion 21*b* and does not flow out. Therefore, it is possible to reliably prevent insulating outer covers 1*d* and 2*b* of a shielding electric wire 1 and a ground wire 2 from being partially broken by the fused resin.

In the third embodiment, even if the two resin members are slightly shifted from each other, the protruded portion 20 can smoothly be inserted in the hole 21 by the inclined faces 20*b* and 20*b* of the tip face 20*a* of the protruded portion 20. Consequently, it is possible to enhance a butting workability between the resin members.

Next, a variant of the third embodiment will be described. In the variant, a tip face 20*a* of a protruded portion 20 has all ends opposed to each other which are formed on inclined faces. Moreover, step faces are formed over a whole periphery on a boundary between a protrusion inserting portion 21*a* and a resin inflow portion 21*b*. All of the step faces are formed to be horizontal flat faces.

In the variant of the third embodiment, the inclined faces provided on the whole periphery of the tip face of the protruded portion abut on the edges of the horizontal flat faces in a hole in line contact. Therefore, are action force received from the edges of the horizontal flat faces in the hole by the inclined face of the protruded portion is distributed more uniformly and the contact area (line contact distance) of the tip face of the protruded portion and the inclined face in the hole is further increased. Consequently, a sticking force between a pair of resin members can further be enhanced.

Figure 11:
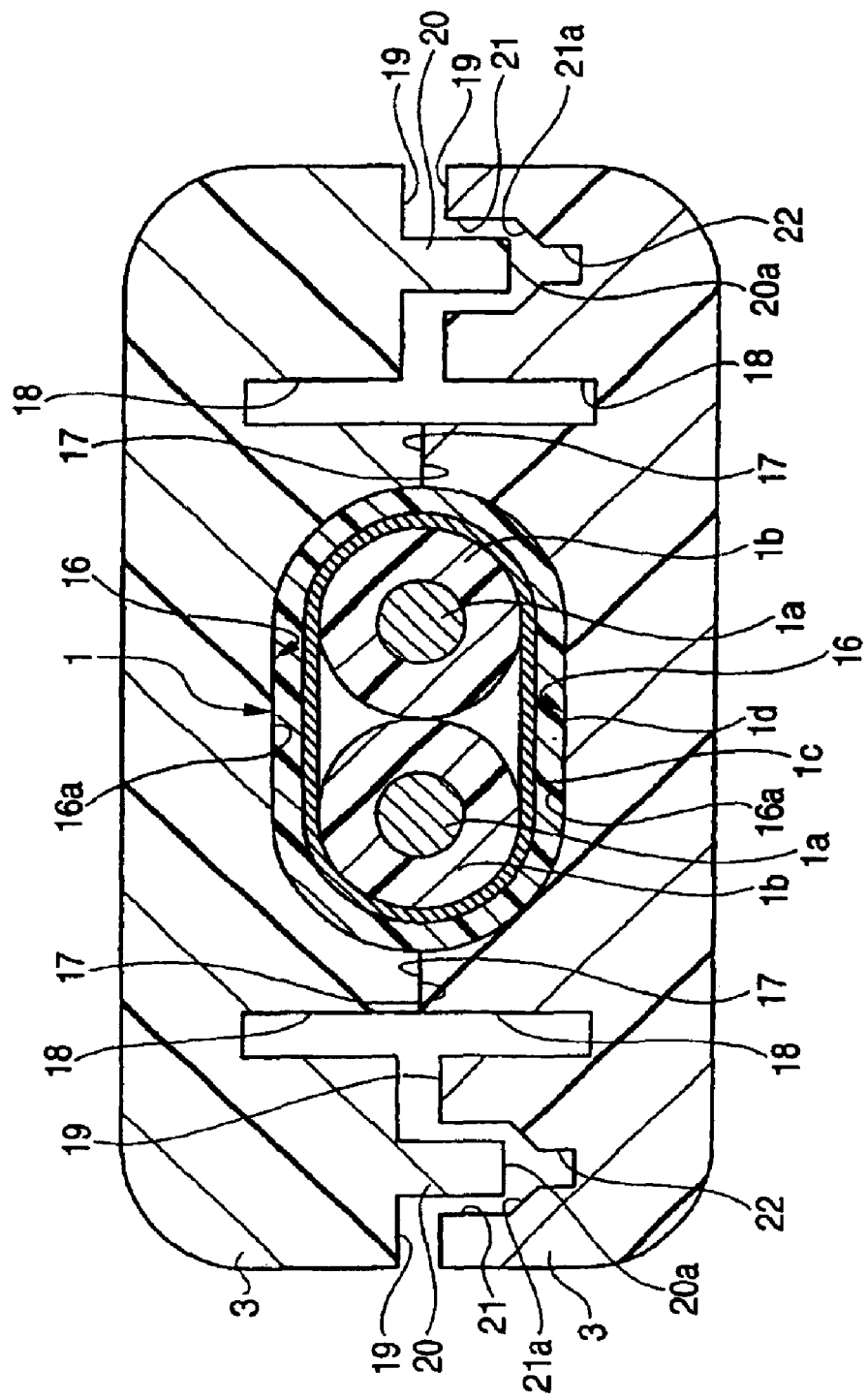
FIG. 11 is a sectional view showing a state in which a shielding electric wire and a ground wire are interposed between two resin members in the application of an ultrasonic wave according to a fourth embodiment of the invention.

FIG. 11 is a sectional view showing a state in which a shielding electric wire 1 and a ground wire 2 are interposed between two resin members 3 and 3 in the application of an ultrasonic wave according to a fourth embodiment of the invention.

As shown in FIG. 11, in the second embodiment, both of electric wire abutment faces 16 and 16 are fitted to the shielding electric wire 1 and the ground wire 2 and a portion between both of electric peripheral faces 17 and 17 is brought into a fitting condition, and a tip face 20*a* of a protruded portion 20 and a bottom face 21*a* of a hole 21 are set into a separating condition in a state in which the shielding electric wire 1 and the ground wire 2 are interposed between the upper and lower resin members 3 and 3 in the application of the ultrasonic wave. Since other structures are the same as those in the first embodiment, detailed description will be omitted.

In the fourth embodiment, the application of the ultrasonic wave is started, a vibration energy directly acts on the electric wire abutment face 16 and the electric wire peripheral face 17 at the beginning of the application and is thus distributed. When the fusion of the resin progresses so that the tip face 20*a* of the protruded portion 20 and the bottom face 21*a* of the hole 21 are fitted to each other, the vibration energy also acts directly on the protruded portion 20 and the bottom face 21*a* of the hole 21 and the fusion of the resin in that portion is thus started. Consequently, the vibration energy converges on neither only the electric wire abutment face 16 nor only the protruded portion 20 and the bottom face 21*a* of the hole 21. Thus, the insulating performance of the shielding electric wire 1 can be improved and the electric wire holding force can be enhanced.

Figure 12:
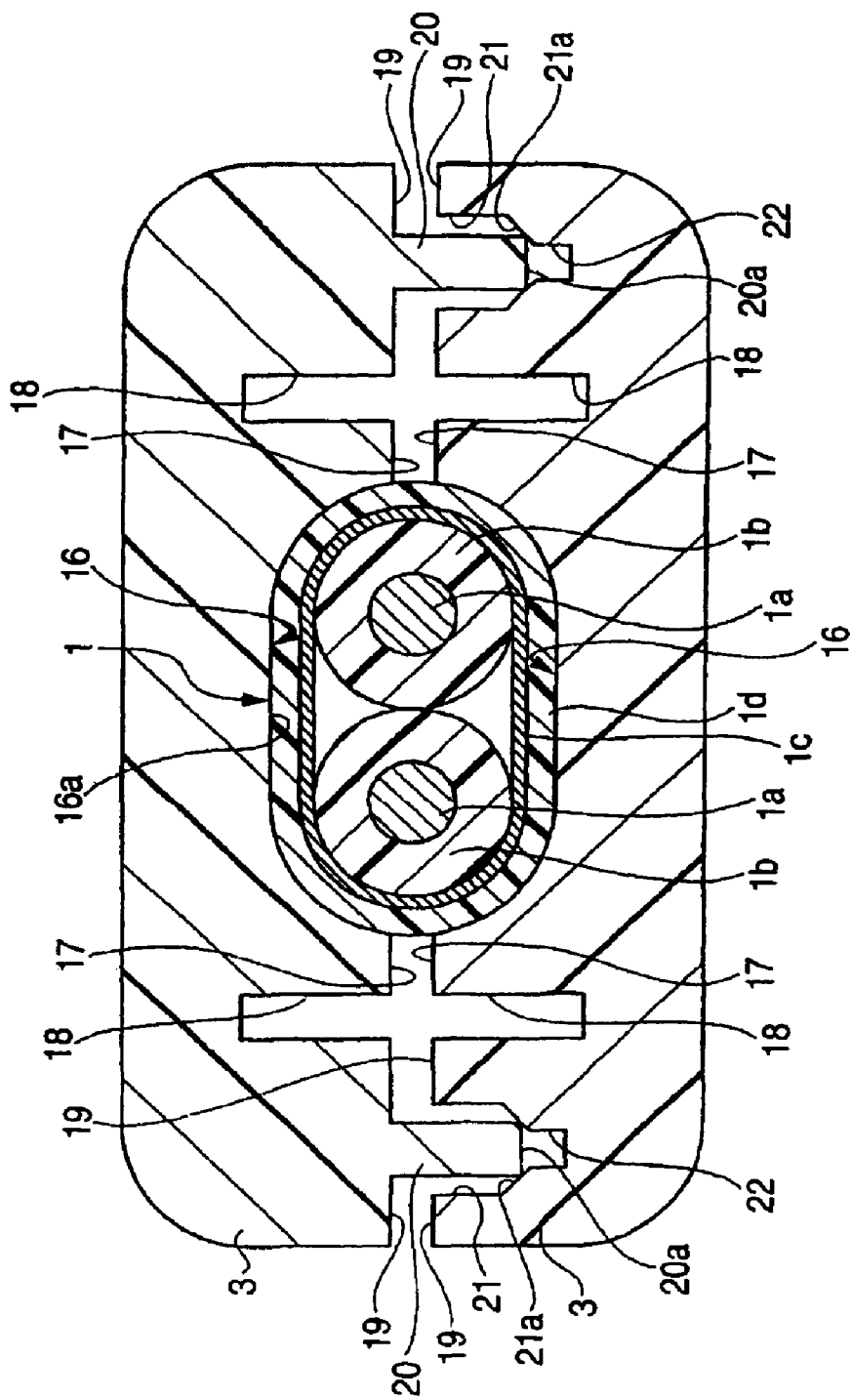
FIG. 12 is a sectional view showing a state in which a shielding electric wire and a ground wire are interposed between two resin members in the application of an ultrasonic wave according to a fifth embodiment of the invention.
Figure 13:
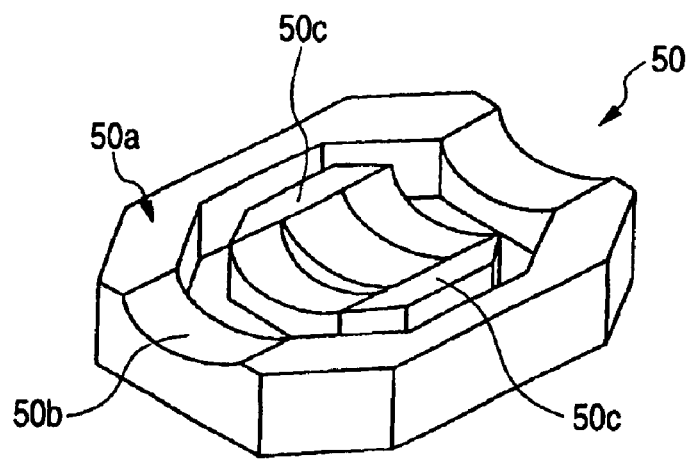
FIG. 13(*a*) is a perspective view showing a resin member to be provided in an upper position of the conventional art.
Figure 13:
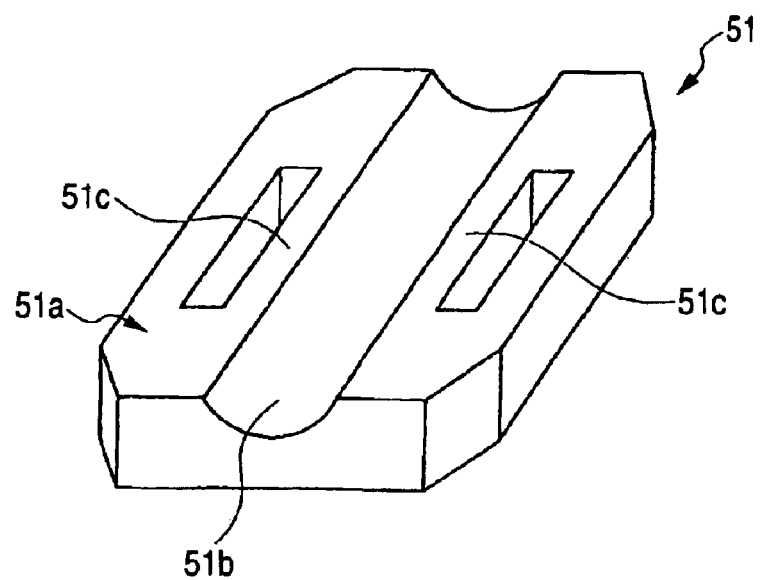
Figure 14:
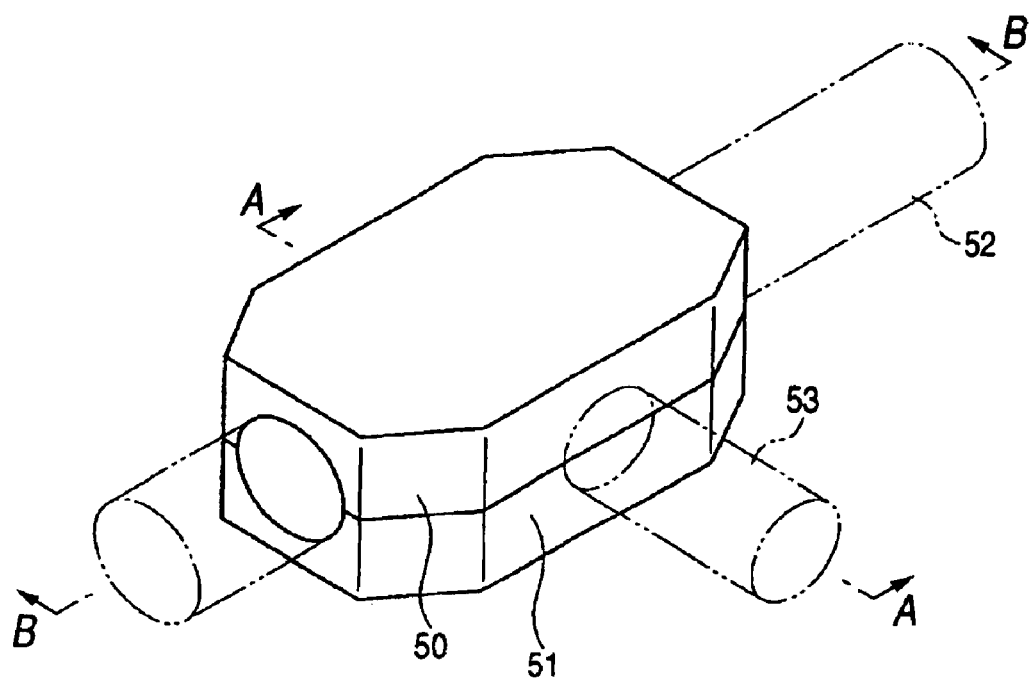
FIG. 14 is a perspective view showing an ultrasonic welding portion according to the conventional art.
Figure 15:
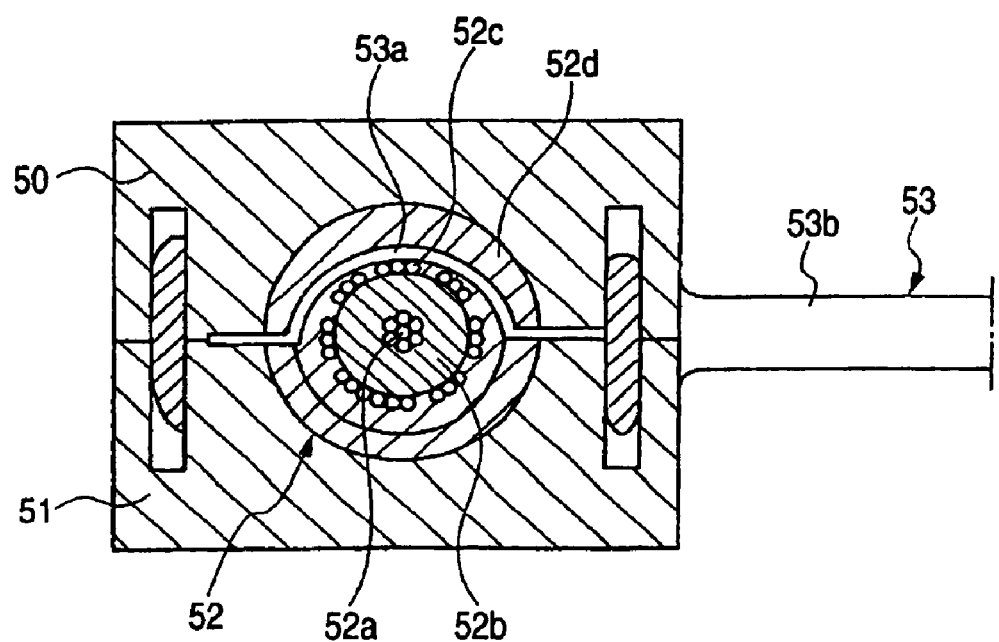
FIG. 15 is a sectional view taken along an A—A line in FIG. 14 according to the conventional art.
Figure 16:
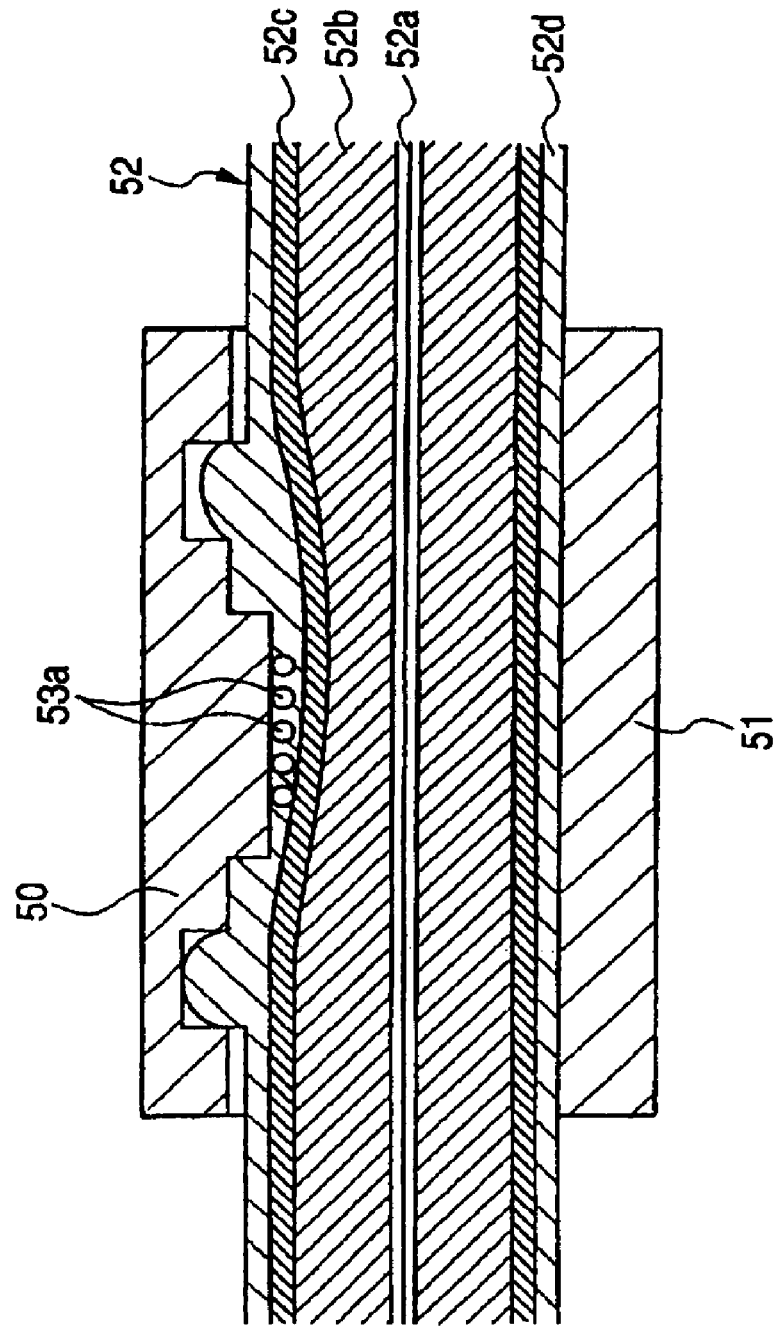
FIG. 16 is a sectional view taken along a B—B line in FIG. 14 according to the conventional art.
Figure 17:
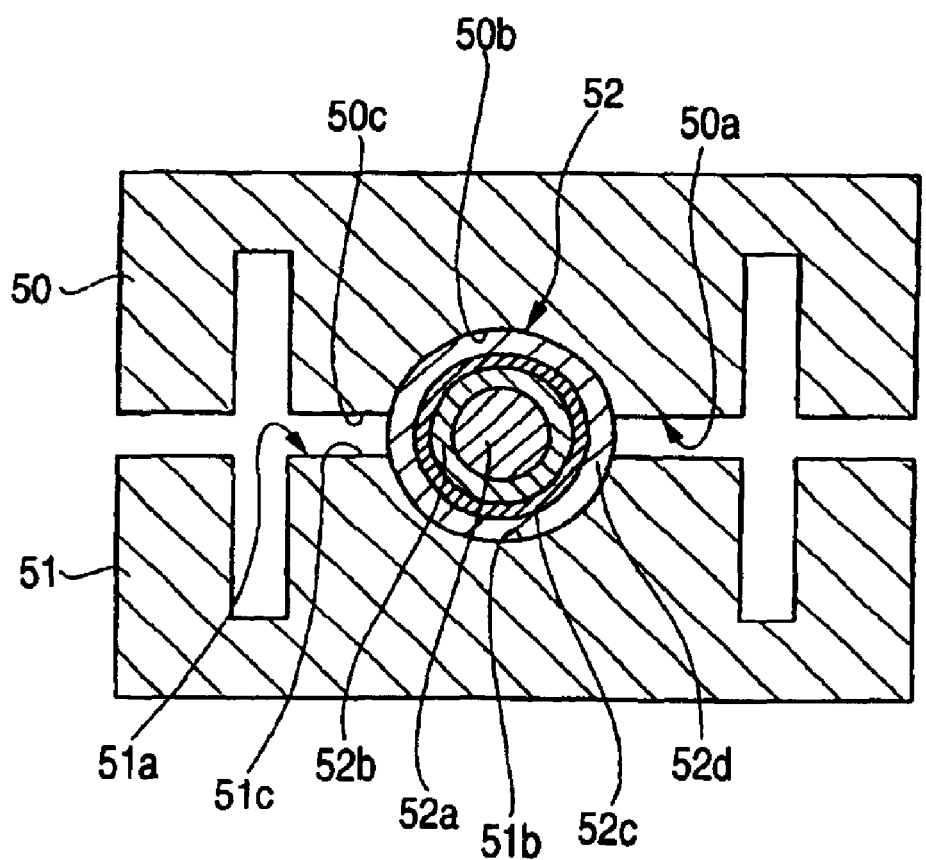
FIG. 17 is a sectional view showing a state in which a shielding electric wire and a ground wire are interposed between two resin members in the application of an ultrasonic wave according to the conventional art.

FIG. 12 is a sectional view showing a state in which a shielding electric wire 1 and a ground wire 2 are interposed between two resin members 3 and 3 in the application of an ultrasonic wave according to a fifth embodiment of the invention.

As shown in FIG. 12, in the third embodiment, both of electric wire abutment faces 16 and 16 are fitted to the shielding electric wire 1 and the ground wire 2 and a portion between a tip face 20*a* of a protruded portion 20 and a bottom face 21*a* of a hole 21 is brought into a fitting condition, and a portion between both of electric peripheral faces 17 and 17 is set into a separating condition in a state in which the shielding electric wire 1 and the ground wire 2 are interposed between the upper and lower resin members 3 and 3 in the application of an ultrasonic wave. Since other structures are the same as those in the first embodiment, detailed description will be omitted.

In the fifth embodiment, when the application of the ultrasonic wave is started, a vibration energy directly acts on the electric wire abutment faces 16 and 16 and the protruded portion 20 and the bottom face 21a of the hole 21 at the beginning of the application and is thus distributed. When the fusion of the resin progresses so that the electric wire peripheral faces 17 and 17 are fitted to each other, the vibration energy also acts directly on the electric wire peripheral faces 17 and 17 and the fusion of the resin in that portion is thus started. As described above, the vibration energy converges on neither only the electric wire abutment faces 17 and 17 nor only the protruded portion 20 and the bottom face 21a of the hole 21. Thus, the insulating performance of the shielding electric wire 1 can be improved and the electric wire holding force can be enhanced.

According to each of the embodiments, the shielding member of the shielding electric wire 1 is formed by the braided wire 1c, and preferably, is a conductive member covering almost the whole region of the outer peripheries of the insulating inner covers 1b and 1b and may be formed by a conductive metallic foil, for example.

While the description has been given to the case in which the shielding process is carried out over the shielding electric wire 1 having the two cores 1a and 1a which are twisted in the embodiments, the invention can similarly be applied to a shielding electric wire having one core 1a or at least three cores 1a or a shielding electric wire having two cores which are not twisted.

What is claimed is:

1. A shielding structure of a shielding electric wire comprising:
    a shielding electric wire obtained by covering an outer periphery of a core with a shielding member;
    a ground wire;
    two resin members interposing between the shielding electric wire and the ground wire;
    a protruded portion provided on one of junction faces of the two resin members; and
    a hole defined by a protrusion inserting portion for inserting the protruded portion and a resin inflow portion provided in an inner position from the protrusion inserting portion and having a smaller width than a width of the protrusion inserting portion, provided on the other junction face,
    wherein one of ends on both sides of a tip face of the protruded portion and step faces at both sides on a boundary between the protrusion inserting portion and the resin inflow portion in the hole are formed to be inclined faces.

2. The shielding structure of the shielding electric wire according to claim 1, wherein the inclined face is formed on the step face side of the boundary between the protrusion inserting portion and the resin inflow portion in the hole.

3. The shielding structure of the shielding electric wire according to claim 1, wherein a pair of step faces is formed in opposed positions to each other on the boundary between the protrusion inserting portion and the resin inflow portion and is provided to be the inclined faces.

4. The shielding structure of the shielding electric wire according to claim 1, wherein the step faces are formed over a whole periphery on the boundary between the protrusion inserting portion and the resin inflow portion, and all of the step faces are formed to be the inclined faces.

5. The shielding structure of the shielding electric wire according to claim 1, wherein the inclined face is formed on the tip face side of the protruded portion.

6. The shielding structure of the shielding electric wire according to claim 5, wherein the tip face of the protruded portion has a pair of ends opposed to each other which is formed to be the inclined faces.

7. The shielding structure of the shielding electric wire according to claim 5, wherein the tip face of the protruded portion has all of the ends opposed to each other which are formed to be the inclined faces.

8. The shielding structure of the shielding electric wire according to claim 1, wherein each of the resin members is provided with the protruded portion on a first diagonal line passing through a virtual center and in a position placed apart from the virtual center at an equal distance and the hole on a second diagonal line passing through the virtual center and in a position placed apart from the virtual center at an equal distance.

9. A shielding structure of a shielding electric wire comprising:
    a shielding electric wire obtained by covering an outer periphery of a core with a shielding member;
    a ground wire;
    two resin members interposing between the shielding electric wire and the ground wire, each resin members containing a junction face including an electric wire abutment face on which the shielding electric wire and the ground wire abut and an electric wire peripheral face around the electric wire abutment face, and a protruded portion being provided on one of the resin members and a hole for inserting the protruded portion being provided on the other resin member, and
    wherein both of the electric wire abutment faces are fitted to the shielding electric wire and the ground wire and at least one of a portion between both of the electric wire peripheral faces and a portion between the protruded portion and a bottom face of the hole is set into a fitting condition in a state in which the shielding electric wire and the ground wire are interposed between the two resin members.

10. The shielding structure of the shielding electric wire according to claim 9, wherein the portion between both of the electric wire peripheral faces and the portion between the protruded portion and the bottom face of the hole are set into the fitting condition in the state in which the shielding electric wire and the ground wire are interposed between the two resin members.

11. The shielding structure of the shielding electric wire according to claim 9, wherein the portion between both of the electric wire peripheral faces is set into the fitting condition and the portion between the protruded portion and the bottom face of the hole is set into a separating condition in the state in which the shielding electric wire and the ground wire are interposed between the two resin members.

12. The shielding structure of the shielding electric wire according to claim 9, wherein the portion between both of the electric wire peripheral faces is set into a separating condition and the portion between the protruded portion and the bottom face of the hole is set into the fitting condition in the state in which the shielding electric wire and the ground wire are interposed between the two resin members.

* * * * *